No. 867,498. PATENTED OCT. 1, 1907.
H. J. GILBERT.
PULLEY.
APPLICATION FILED JULY 6, 1903.
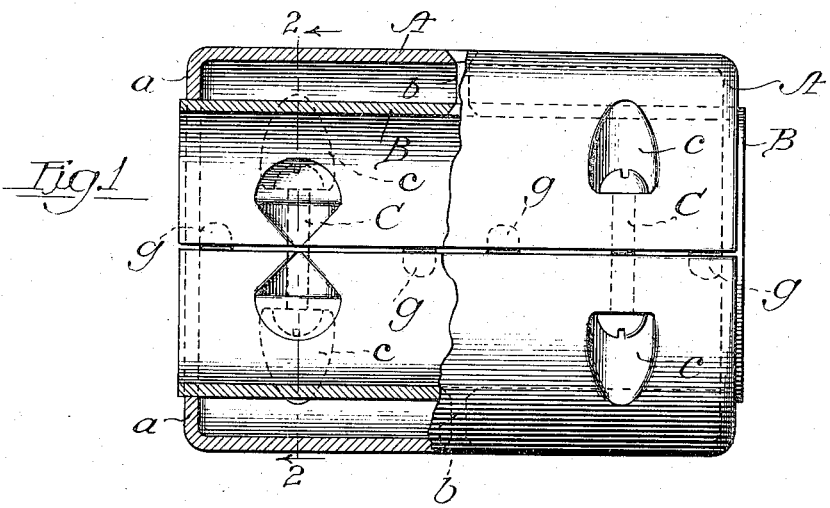
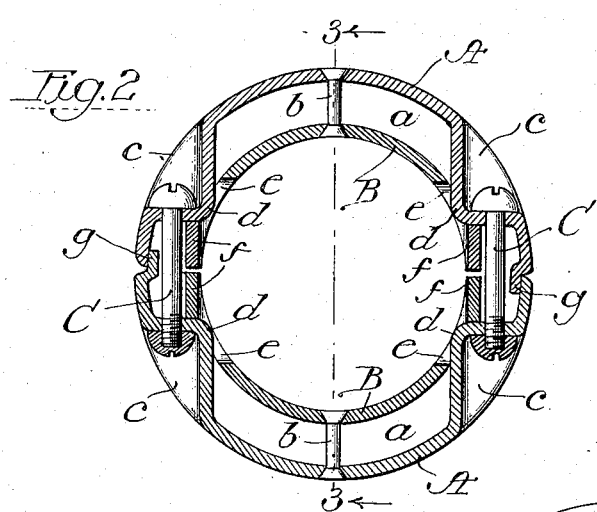
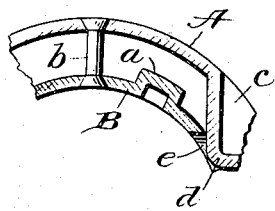
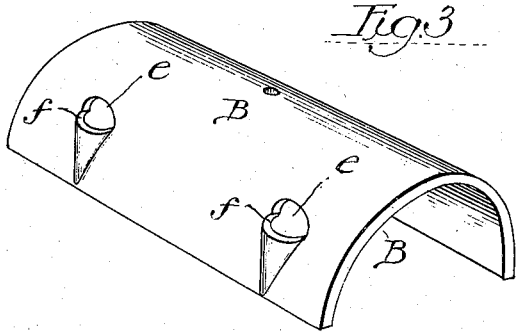
Witnesses
Edw. Barrett
Harold G. Barrett
Inventor
Henry J. Gilbert
By Rector & Hibben
his Attys.

UNITED STATES PATENT OFFICE.

HENRY J. GILBERT, OF SAGINAW, MICHIGAN.

PULLEY.

No. 867,498.　　　　Specification of Letters Patent.　　　　Patented Oct. 1, 1907.

Application filed July 6, 1903. Serial No. 164,426.

*To all whom it may concern:*

Be it known that I, HENRY J. GILBERT, a citizen of the United States, residing at Saginaw, in the county of Saginaw, in the State of Michigan, have invented certain new and useful Improvements in Pulleys, of which the following is a description, reference being had to the accompanying drawings, forming part of this specification.

While my invention primarily relates to pulleys, and more particularly to pulleys of small size but having relatively large shaft openings, it may also be utilized for other purposes, such as shaft couplings, as hereinafter explained.

It has for its object the construction of a simple, cheap and efficient structure of this character from sheet metal.

In the accompanying drawings, Figure 1 is a side elevation of a pulley embodying my invention, in the position shown in Fig. 2, with a portion of one end cut away to expose the interior thereof; Fig. 2 a cross-section on the line 2—2 of Fig. 1; Fig. 3 a perspective view of one half of the inner shell of the pulley; and Fig. 4 a detail of Fig. 3 showing a key-way.

The same letters of reference are employed to indicate corresponding parts in the several views.

My novel pulley is preferably composed of a two-part outer shell or cylinder A having inturned flanges $a$ at its opposite ends, and a two-part inner shell or cylinder B extending lengthwise through the outer shell and fitting in the circular openings in the end flanges of the latter, Fig. 1, the respective halves of the outer and inner shells being secured together by rivets $b$.

To form clamping surfaces for the bolts C, by means of which the two halves of the pulley are secured together and clamped upon the shaft, the outer shell A of the pulley is provided on each side of the pulley with four angular indentations $c$ of the shape shown, whose surfaces parallel with the dividing line of the pulley form bearing or clamping surfaces for the heads and nuts of the bolts C, the latter in the present instance being provided with nicked heads and nuts to permit the employment of a screw driver instead of a wrench. The indentations $c$ are formed in the shell A by suitable dies for the purpose.

To accommodate the inner corners $d$ of the indentations $c$ the inner shell or cylinder B is provided with openings $e$ coincident with said corners, into which openings the corners project, Fig. 2. The metal of the shell B between said openings and the inner edges of the shell is forced outwardly, as shown in Fig. 3, thereby forming supports or saddles $f$ projecting under the clamping or bearing surfaces formed by the indentations $c$ in the outer shell A, as shown in Fig. 2. The two halves of the inner shell B are slightly less than half circles, so that when applied to the shaft their inner edges remain slightly separated for clamping purposes, as is also true of the inner edges of the two halves of the outer shell or cylinder A; and it results from the provision of the supporting saddles $f$ that the strain of the clamping bolts is applied directly to the saddles $f$ so that the inner shell or cylinder, of which said saddles form a part, is directly and securely gripped to the shaft with the full power of the bolts.

For the purpose of further locking the two halves of the pulley against endwise or sidewise displacement relatively to each other I provide the two halves of the outer shell A, along their meeting edges, with ears or lugs $g$, alternately arranged upon the opposite halves of the pulley and each fitting snugly within the edge of the opposing half of the shell. Four of these lugs are arranged immediately within the end flanges $a$ of the shell A, as indicated in Fig. 1, so that their engagement with said end flanges prevents longitudinal displacement of the two halves of the pulley relatively to each other, while their engagement with the edges of the cylindrical portions of the shell prevents lateral displacement.

Instead of the lugs $g$, continuous flanges along the meeting edges of the outer shell may be employed, said flanges being either formed integral with the shell, as are the lugs $g$, or composed of separate strips of sheet metal secured to the edges of the shell.

Some of the advantages of my invention may be utilized in a pulley comprising simply the two part outer shell A having the end flanges $a$ and the indentations $c$, and the bolts C having their heads and nuts bearing upon the clamping surfaces of said indentations, either with or without the employment of the lugs $g$; but the pulley is strengthened and its efficiency increased by the employment of the two part inner cylinder B provided with the supporting saddles $f$ for the clamping surfaces of the outer shell, and also given a larger and more secure bearing upon the shaft. Where the outer shell alone is employed the indentations $c$ will not extend inwardly beyond the plane of the inner edges of the end flanges $a$ and the latter will bear directly against the shaft or interposed bushings. Again, even where the inner shell is employed, it is not essential that the corners $d$ of the indentations $c$ shall project into the inner shell, and therefore not necessary that the openings $e$ therefor be provided, simple slits in the shell sufficing for the forcing outward of the metal to form the supports $f$ in such case; but it is often a desideratum in small sized pulleys to be able to provide as large a shaft opening as possible relative to the outside diameter of the pulley, and the provision of the openings $e$, accommodating the inner corners of the indentations $c$, permits this purpose to be accomplished to a maximum degree.

As will be understood from the foregoing description of my invention as embodied in a pulley, it may be readily utilized in shaft couplings. The exact structure which has been illustrated and described as a pulley may be used as such a coupling, and a key-way be provided in it as in Fig. 4 if it is desired to key the coupling to the shaft instead of employing it as a friction coupling. The two-part outer shell A and clamping bolts may likewise be employed as a coupling independent of the inner shell B, in which event a two-part thimble or bushing would be inserted within the coupling in lieu of the inner shell in order to give the necessary bearing for the coupling upon the ends of the shafts.

Where the complete structure which I have illustrated and described is employed as a coupling it may be utilized to couple together shafts of different sizes, by employing bushings of different thicknesses between the coupling and the respective shafts.

Having thus fully described my invention, I claim:

1. The herein described sheet metal structure for pulleys and the like, comprising the two-part outer shell A having the end flanges $a$ and the indentations $c$ forming the clamping surfaces for the bolts, and the bolts C; substantially as described.

2. The herein described sheet metal structure for pulleys and the like, comprising the two-part outer shell A having the end flanges $a$ and the indentations $c$ forming the clamping surfaces for the bolts, and provided along the meeting edges of the shell with interlocking projections, and the bolts C; substantially as described.

3. The herein described sheet metal structure for pulleys and the like, comprising the two-part outer shell A having the end flanges $a$ and indentations $c$ forming the clamping surfaces for the bolts, and provided with the lugs $g$ and the bolts C; substantially as described.

4. The herein described sheet metal structure for pulleys and the like, comprising the two-part outer shell A having the end flanges $a$ and indentations $c$ forming the clamping surfaces for the bolts, the two-part inner shell B provided with the supporting saddles $f$ projecting beneath the clamping surfaces of the outer shell, and the bolts C for uniting the two halves of the pulleys; substantially as described.

5. The herein described sheet metal structure for pulleys and the like, comprising the two-part outer shell A having the end flanges $a$ and indentations $c$ and provided along the meeting edges of the shell with interlocking projections, the two-part inner shell B provided with the supporting saddles $f$ for the clamping surfaces formed by the indentations $c$, and the bolts C; substantially as described.

6. The herein described sheet metal structure for pulleys and the like, comprising the two-part outer shell A having the end flanges $a$ and indentations $c$ and provided along the meeting edges of the shell with the lugs $g$, the two-part inner shell B provided with the supporting saddles $f$ for the clamping surfaces formed by the indentations $c$, and the bolts C; substantially as described.

7. The herein described sheet metal structure for pulleys and the like, comprising the two-part outer shell A having the end flanges $a$ and indentations $c$ forming clamping surfaces for the clamping bolts, the two-part inner shell $b$ having the openings $e$ to accommodate the inner corners of the indentations $c$ in the outer shell and provided with the supporting saddles $f$ for the clamping surfaces, and the bolts C; substantially as described.

8. A sheet metal pulley comprising the two-part outer shell A having the end flanges $a$ and indentations $c$ and provided along the meeting edges of its halves with the lugs $g$, the two-part inner shell B having the openings $e$ to accommodate the inner corners of the indentations and provided with the supporting saddles $f$ for the clamping surfaces formed by said indentations, and the bolts C; substantially as described.

9. The herein described pulley comprising a two-part outer shell having marginal flanges $a$ inwardly directed towards the shaft opening and adjacent thereto, and means for clamping the parts of the shell; substantially as described.

10. The herein described pulley comprising a two-part outer shell having marginal flanges $a$ inwardly directed towards the shaft opening and also having interlocking edges, and means for clamping the parts of the shell; substantially as described.

11. The herein described pulley comprising a two-part outer shell A having flanges $a$ inwardly directed towards the shaft opening, a two-part inner shell arranged within the outer shell, and means for clamping said shells; substantially as described.

12. The herein described pulley comprising a two-part outer shell A having flanges $a$, a two-part inner shell arranged within the outer shell and in contact with said flanges, said outer shell having indentations forming clamping surfaces for the bolts, and bolts for clamping said parts together; substantially as described.

13. The herein described pulley comprising a two-part outer shell A having flanges $a$, a two-part inner shell upon which the outer shell is saddled and arranged concentric therewith, and means for clamping the parts of the shells; substantially as described.

14. The herein described pulley comprising a two-part outer shell A having flanges $a$ and also having along the meeting edges ears or lugs $g$ alternately arranged upon the opposite halves of the pulley and each fitting within the edge of the opposing half of the shell, and means for clamping the parts of the shell; substantially as described.

15. A pulley comprising a two-part outer shell and a two-part inner shell, means for supporting said shells in concentric relation, and means for clamping the parts of the shell; substantially as described.

16. A pulley comprising a two-part outer shell and a two-part inner shell, one of said shells having flanges for spacing the two shells; substantially as described.

17. A pulley comprising a two-part outer shell and a two-part inner shell, means for supporting said shells in concentric relation, and clamping bolts passing through and engaging the parts of the outer shell for clamping together the parts of said shell and for also clamping together the outer and inner shell; substantially as described.

18. A pulley comprising two concentric shells, one of the shells having end flanges closing the annular space between such shells, and means for clamping the shells together; substantially as described.

19. A pulley comprising two concentric shells, one of which has a flange bearing against and arranged to support the other shell, and means for clamping the shells together; substantially as described.

HENRY J. GILBERT.

Witnesses:
EDWARD RECTOR,
LOUIS B. ERWIN.